United States Patent
Hoffenberg

(10) Patent No.: US 7,913,949 B2
(45) Date of Patent: Mar. 29, 2011

(54) SYMMETRIC LEADING EDGE DEVICE AND METHOD TO DELAY FLOW SEPARATION

(75) Inventor: Robert Hoffenberg, Seattle, WA (US)

(73) Assignee: The Boeing Company, Chicago, IL (US)

( * ) Notice: Subject to any disclaimer, the term of this patent is extended or adjusted under 35 U.S.C. 154(b) by 880 days.

(21) Appl. No.: 11/761,023

(22) Filed: Jun. 11, 2007

(65) Prior Publication Data
US 2008/0302919 A1  Dec. 11, 2008

(51) Int. Cl.
*B64C 9/22* (2006.01)
*B64C 3/50* (2006.01)
(52) U.S. Cl. .......................... 244/87; 244/214
(58) Field of Classification Search ............. 244/87, 244/213–214, 216
See application file for complete search history.

(56) References Cited

U.S. PATENT DOCUMENTS

| | | | | |
|---|---|---|---|---|
| 1,820,271 A | * | 8/1931 | Ebel et al. | 244/87 |
| 1,827,304 A | * | 10/1931 | Thurston | 244/82 |
| 2,076,283 A | * | 4/1937 | Jerzy et al. | 244/87 |
| 2,126,502 A | * | 8/1938 | Redlinger | 244/35 R |
| 2,387,526 A | | 10/1945 | Nagamatsu | |
| 2,480,040 A | * | 8/1949 | Mitchell | 244/87 |
| 2,702,676 A | | 2/1955 | Delaney, Jr. | |
| 2,938,680 A | | 5/1960 | Greene et al. | |
| 4,471,928 A | | 9/1984 | Cole | |
| 4,753,402 A | | 6/1988 | Cole | |
| 5,110,072 A | * | 5/1992 | Owl | 244/213 |
| 5,927,656 A | * | 7/1999 | Hinkleman | 244/203 |
| 6,789,769 B2 | | 9/2004 | Mau et al. | |

FOREIGN PATENT DOCUMENTS
GB   1296994   11/1972

OTHER PUBLICATIONS

Lajux, Vincent and Fielding, Prof. John. "Development of a Variable Camber Leading Edge Device Design Methodology," AIAA 5th Aviation Technology, Integration, and Operations Conference (ATIO) (Sep. 26-28, 2005) Arlington, Virginia, pp. 1-13.
Smith, A. M. "High-Lift Aerodynamics," The 37th Wright Brothers Lecture, J. Aircraft, vol. 12, No. 6, Jun. 1975, pp. 501, 518-523.

* cited by examiner

*Primary Examiner* — Tien Dinh
(74) *Attorney, Agent, or Firm* — Harness, Dickey & Pierce, P.L.C.

(57) ABSTRACT

A vertical tail for use with an aircraft or other form of mobile platform. The vertical tail includes a main element which is fixedly secured to the mobile platform, and a leading edge element that is movably secured to the main element. The cross section of the leading edge element is symmetric about the cruise chord line of the tail. The leading edge element can be pivoted and/or extended to create a gap with the main (fixed) element. The movable leading edge element is used to increase the maximum yawing moment provided by the vertical tail. The maximum yawing moment is increased when air flow is incident from either side of the vertical tail.

12 Claims, 5 Drawing Sheets

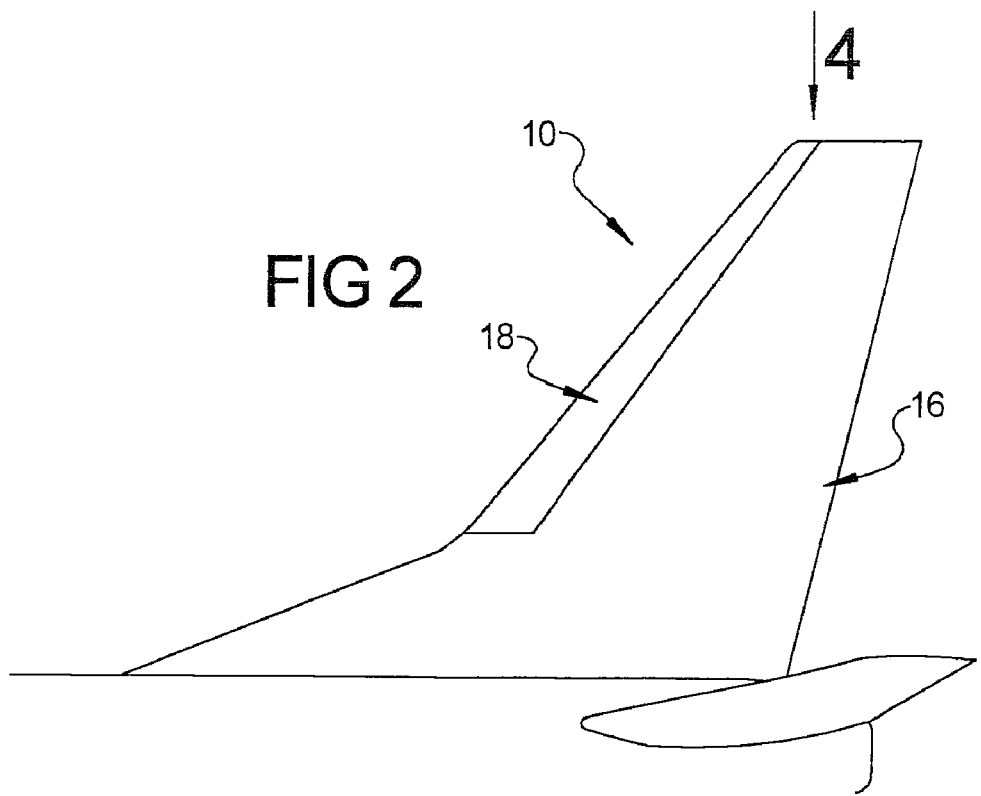
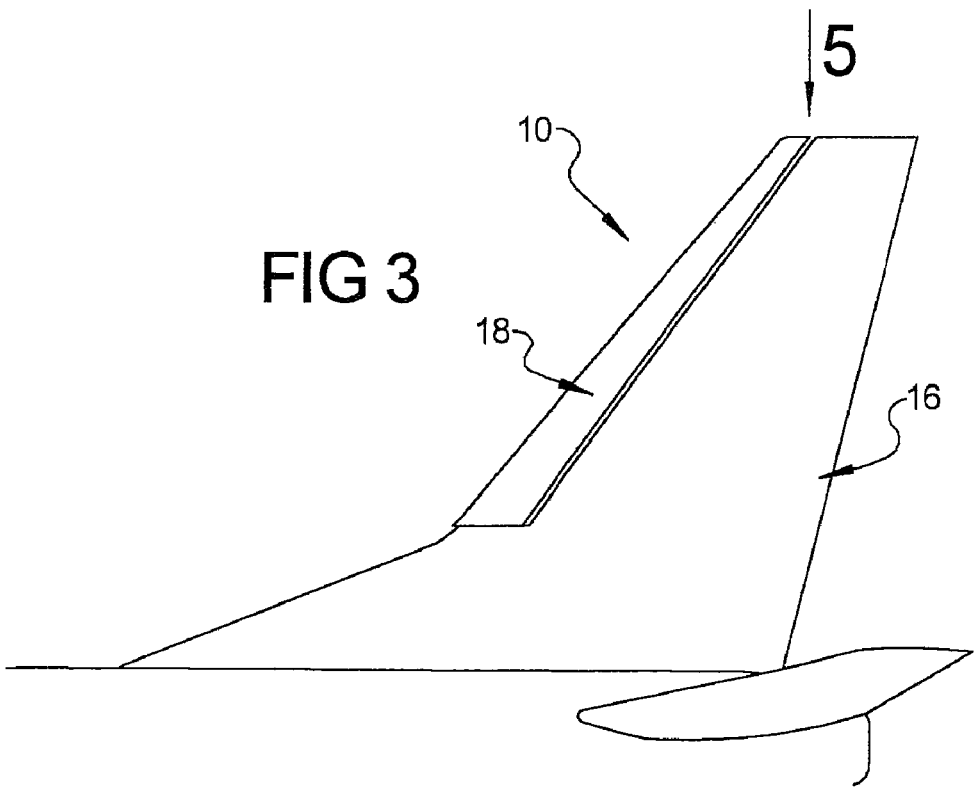

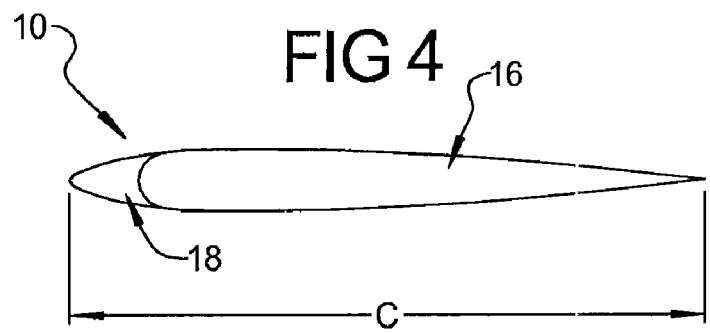
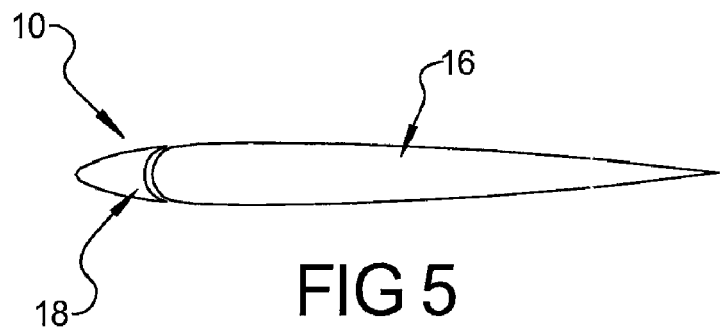
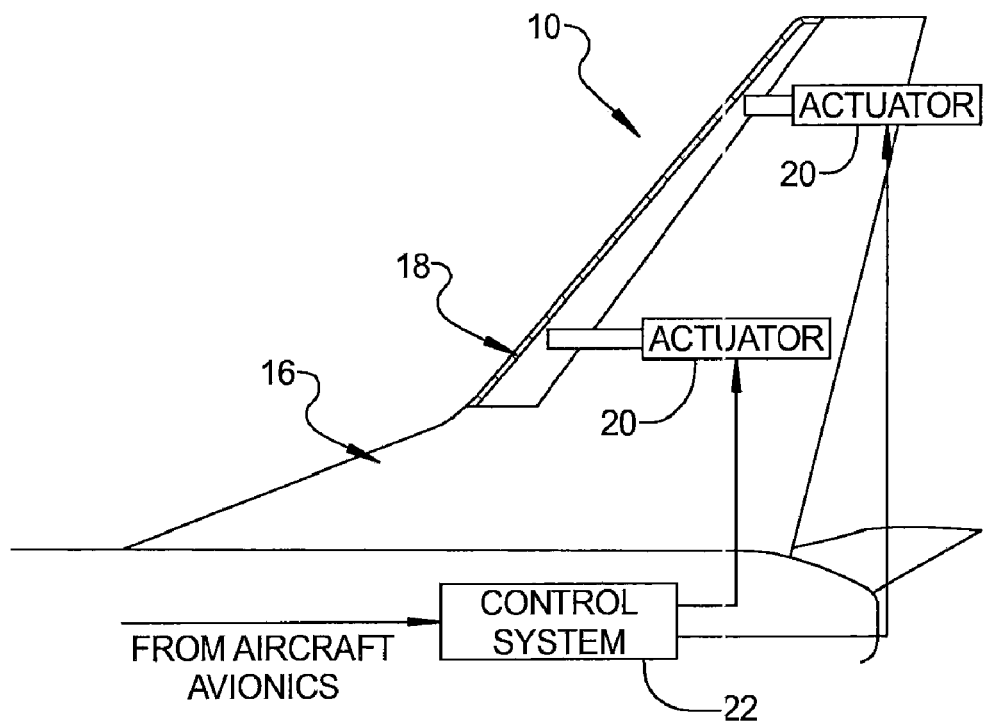

SYMMETRIC LEADING EDGE DEVICE AND METHOD TO DELAY FLOW SEPARATION

FIELD

The present disclosure relates to airborne mobile platforms, and more particularly to a movable leading edge component for a vertical tail that can be deployed to help delay flow separation from the tail of the mobile platform as the sideslip angle increases.

BACKGROUND

The statements in this section merely provide background information related to the present disclosure and may not constitute prior art.

With airborne mobile platforms such as commercial and military aircraft, tail surfaces are sized to maintain control of the aircraft throughout the flight envelope.

Presently, there is an interest in reducing the "loss of control" speed of an aircraft that is caused by separation of flow from the vertical tail. Present day solutions involve simply constructing a larger vertical tail or increasing the size of a rudder used with the tail. Simply increasing the overall size of the vertical tail adds weight and drag. Increasing the size of the rudder also adds weight and drag, and can necessitate the use of larger and heavier control actuators.

On aircraft wings, moveable leading edge devices are sometimes used to delay flow separation. Conventional leading edge devices, designed to operate on wings, are intended to delay flow separation only at positive angles of attack. Because a tail must operate at positive or negative sideslip angles (aircraft nose left or right), such (asymmetric) leading edge devices would not be suitable for use on a vertical tail.

SUMMARY

The present disclosure is directed to a system and method for a tail of a mobile platform that enables the aerodynamic characteristics of the tail to be modified in a manner that effectively delays the separation of flow from the tail at sideslip angles where flow separation would occur with conventional tail designs.

In one specific embodiment an airborne mobile platform is disclosed having a fuselage. A vertical tail is attached to the fuselage. The vertical tail includes a leading edge element that is movable such that a maximum aerodynamic yawing moment generated by the tail at a given airspeed can be increased.

In one embodiment the tail includes a leading edge element that may be moved from a retracted position to at least one extended position. When the leading edge element is moved to its extended position, a gap is created between the movable leading edge element and a main (fixed) element of the tail. The moveable leading edge element serves to turn the flow of air before it reaches the main element, thus reducing the pressure peak on the main element. The lower pressure peak serves to reduce deceleration of the boundary layer over the main element, thus making it more resistant to flow separation. This permits the vertical tail to fly at higher sideslip angles without flow separation when the leading edge element is in its extended position. This increases the maximum force (yawing moment) that can be generated by the tail at a given airspeed, enabling an aircraft employing a tail of the present system and method to operate at lower speeds. Because the moveable element is retracted for high-speed flight, skin friction drag is not increased during cruise, as it would be if the tail were simply made larger.

In another embodiment the leading edge element is pivotally supported relative to the main element. The leading edge element can be pivoted from a stowed position generally co-linear with a fore-aft axis of the main element to at least two deflected positions that are symmetric about the main element. In one specific embodiment, the pivotally mounted leading edge component can be deflected in conjunction with a pivotally mounted trailing edge element (i.e. rudder). Using rudder deflection to determine the direction of deflection for the leading edge device, the leading edge element can be pivoted to increase the maximum yawing moment generated by the tail at a given airspeed.

In still another embodiment the leading edge element is pivotally supported from the main element of the tail, and is also extendable to create a gap between the leading edge element and the main element. This combination of motions can provide a greater increase in maximum yawing moment than either just deflection or just use of a gap can alone. Deflection and extension may be controlled independently such that one or the other is used, or coupled together, either with or without movement of a trailing edge element (e.g., a rudder) of the tail.

BRIEF DESCRIPTION OF THE DRAWINGS

The drawings described herein are for illustration purposes only and are not intended to limit the scope of the present disclosure in any way.

FIG. 2 is an enlarged side view of the vertical tail shown in FIG. 1;

FIG. 3 is a view of the tail shown in FIG. 2 but with a leading edge element of the tail shown in its extended (deployed) position, to increase the maximum yawing moment created by the tail;

FIG. 4 is a top plan view of the vertical tail taken in accordance with directional arrow 4 in FIG. 2;

FIG. 5 is a top plan view of the vertical tail taken in accordance with directional arrow 5 in FIG. 3;

FIG. 6 is a partial cross-sectional side view of the vertical tail of FIG. 3 illustrating in simplified form a pair of actuators and a control system;

DETAILED DESCRIPTION

The following description is merely exemplary in nature and is not intended to limit the present disclosure, application, or uses.

Figure 1:
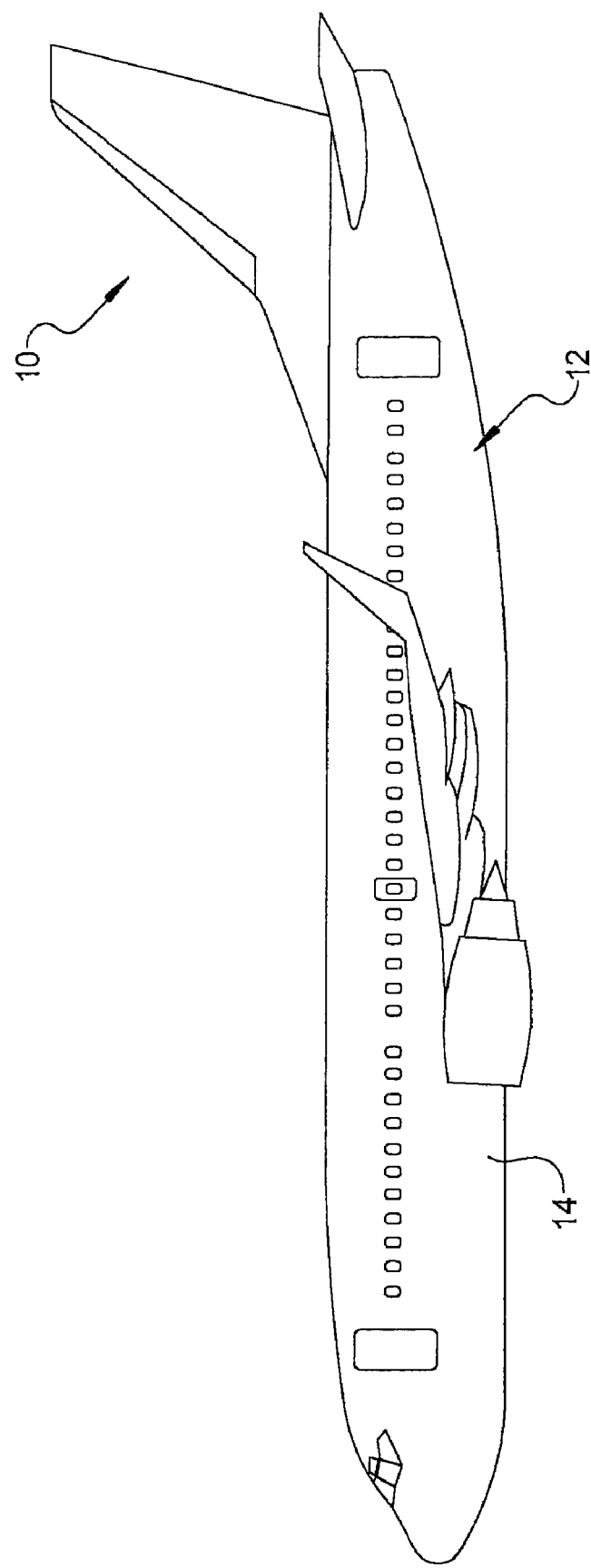
FIG. 1 is a side view of a mobile platform, in this example an aircraft, incorporating a vertical tail in accordance with one embodiment of the present disclosure.

Referring to FIG. 1, a vertical tail 10 in accordance with an embodiment of the present disclosure is illustrated. In this example, the vertical tail 10 is a part of an aircraft 12, but it will be appreciated that the vertical tail 10 could be employed on any airborne mobile platform, or even on a high speed land-based vehicle or a high speed marine vessel. Other specific implementations could be in connection with unmanned air vehicles or missiles. Furthermore, the teachings presented herein could be used in connection with a horizontal fin; therefore it will be appreciated that the present disclosure is not limited to use with only vertically orientated flight control surfaces.

In the example of FIG. 1, the vertical tail 10 is coupled to a fuselage 14 of the aircraft 12 and thus forms an integral portion of the aircraft. With reference to FIGS. 1-3, the vertical tail 10 includes a main element 16 and a leading edge element 18 that is movably secured to the main element 16. When extended (i.e., deployed), the leading edge element 18 is separated from the main element 16 by a small gap, as labeled in FIG. 3. The precise dimension of the gap may vary depending on a specific application, but may typically be on the order of a few percent of the stowed reference chord (designated by "C" in FIG. 4). The dimension of the gap could also be controlled by varying the degree to which the leading edge element 18 is extended, such that the leading edge element could be extended to two or more predetermined positions.

With brief reference to FIGS. 4 and 5, the leading edge element 18 is preferably symmetric in shape about the cruise chord line of the main element 16. The leading edge and main elements 18 and 16, respectively, may be made from aluminum, composites or any other suitable material.

When the leading edge element 18 is extended, it turns the air flow before it reaches the main element 16. This reduces the pressure peak at the forward end of the main element 16. The gap between the leading edge element 18 and the main element 16 allows a fresh boundary layer to form on the main element, and this boundary layer is subjected to a smaller (i.e. less negative) peak pressure due to the initial turning of the flow provided by the leading edge element 18. Because it begins at a lower peak pressure, this boundary layer will undergo less deceleration, delaying flow separation on the main element 16. This permits the tail vertical 10 to remain effective at higher aircraft sideslip angles than would a conventional tail of comparable size.

Aircraft operating speeds are set to maintain prescribed safety margins to many safety criteria. For example, when a twin-engine airplane flies a normal takeoff, its rotation speeds and engine thrust are often defined based on the assumption that an engine failure could occur, even though this may never happen in the life of an aircraft. Similarly, the landing speeds and vertical tail size may be selected to provide adequate control in the event of an engine failure. This may be particularly relevant for a twin-engine aircraft operating at light weights, when speeds are slow and tail control power is reduced. The tail will produce more force if speeds are increased, but this will increase landing distances, and may preclude use of short runways. When the runway surface is wet, increased landing speeds might require an aircraft to divert to an airport with longer runways, burning additional fuel and inconveniencing passengers and/or aircraft operators. Instead of flying at faster speeds, tail power can be improved by increasing the size of the tail. However, this adds weight to the aircraft and increases skin friction drag.

With the vertical tail 10 of the present system and method, the leading edge element 18 can be extended to improve tail performance at low operating speeds. The leading edge element 18 can then be retracted for high speed flight, minimizing the cruise drag penalty. In addition to the drag advantage, the vertical tail 10 of the present system and method may possibly weigh less than a larger conventional tail with equivalent maximum sideslip performance, but this would depend on the details of the implementation.

Previously developed leading edge devices have been used to delay flow separation on aircraft wings. These devices have been asymmetric, however, meaning that they only delay stall at positive angles of attack. The symmetric leading edge devices described in this disclosure can delay stall when flow is incident from either direction, making them suitable for use on a vertical tail.

Figure 7:
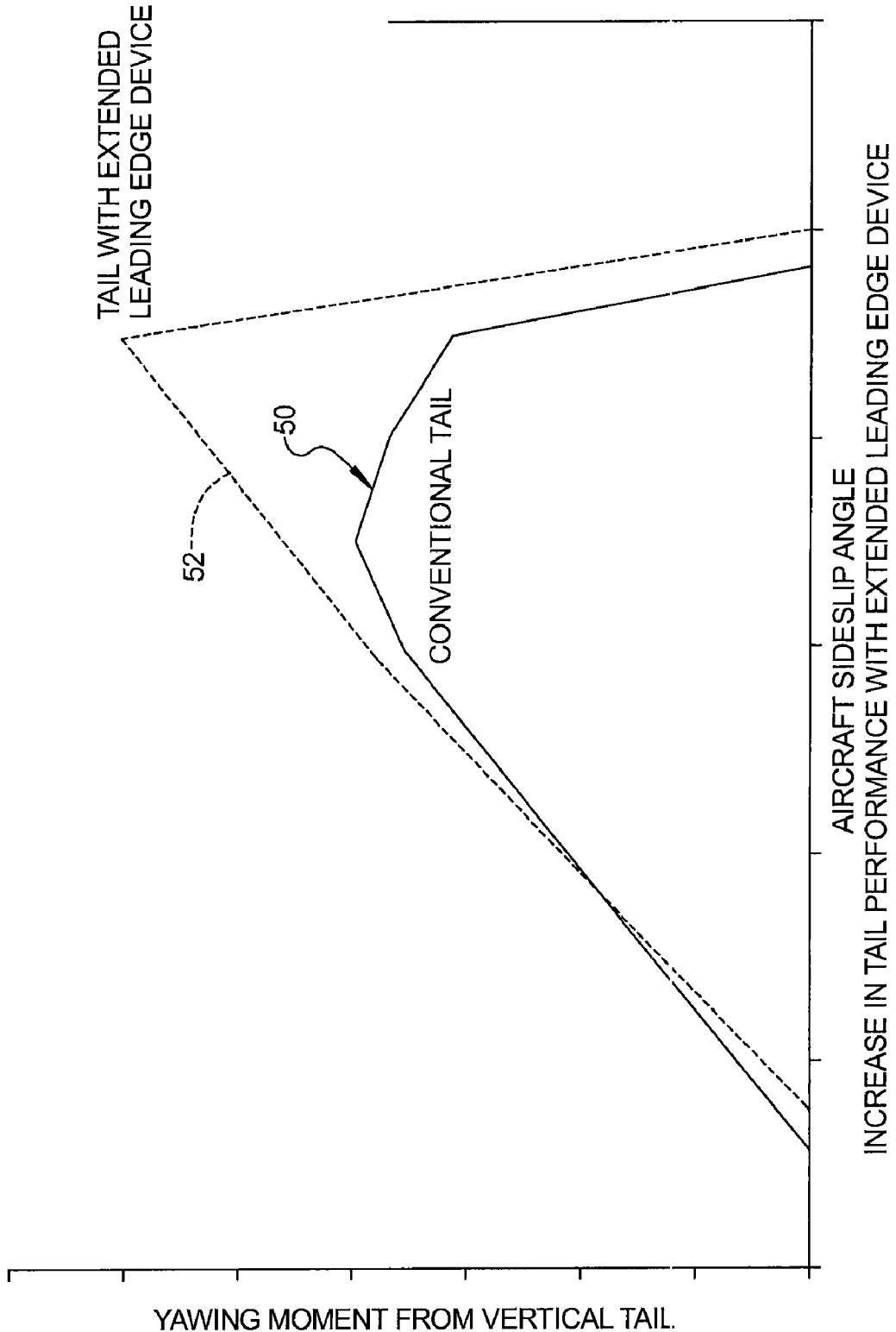
FIG. 7 is a graph with curves illustrating the improvement in yawing moment (vertical axis) at large sideslip angles (horizontal axis), when the leading edge element of the vertical tail is deployed.

The increased maximum yawing moment provided by the vertical tail 10 when operating at large sideslip angles is evidenced in the graph of FIG. 7. These data are based on two-dimensional Navier-Stokes simulations of airfoil sections from a vertical tail. The solid line 50 represents a conventional tail. The dashed line 52 shows the performance of a configuration equipped with a deployable, symmetric leading edge element such as leading edge element 18. Because this device delays flow separation on the main element, the maximum yawing moment created by the tail is increased, relative to a conventional tail.

Referring back to FIG. 6 and the physical construction of the vertical tail 10, the leading edge element 18 may be moved between its retracted and extended positions by one or more actuators 20 that are controlled by signals from a suitable controller 22. The actuators 20 and the controller 22 can be collectively viewed as an actuating system. It will be appreciated that the precise type of actuators 20 and controller 22 employed will depend largely on the specific aircraft that the vertical tail 10 is used with. The actuators 20 may be of the hydraulic, electromechanical or pneumatic varieties, but essentially any type of actuator that is capable of moving the leading edge element 18 between its retracted and extended positions may be employed. Also, while two distinct actuators 20 are shown, it is possible that a greater or lesser number of actuators may be used as dictated by the needs of a specific application. It is anticipated that mechanisms identical or similar to those that are employed to move the slats on the wings of aircraft may be employed to form the actuating system for the vertical tail 10. For example, such mechanisms as disclosed in U.S. Pat. Nos. 2,702,676; 2,938,680; 4,471,928 and 4,753,402, hereby incorporated by reference into the present application, may be suitable for use with some small degree of modification, in forming an actuating system for leading edge devices on the vertical tail 10.

From the above, it should be appreciated that the vertical tail 10, with its moveable leading edge element 18, operates "symmetrically", which is different from conventional leading edge slats typically used on aircraft wings. Thus, it does not need to pivot as the angle of sideslip changes direction. As such, it may be constructed and implemented on an airborne mobile platform more easily and less expensively than a device that needs to change configuration as the sideslip direction changes. This would be particularly significant for a high rate application such as a tail, where actuation requirements for a rudder typically are demanding because the rudder must be able to move quickly.

Figure 8:
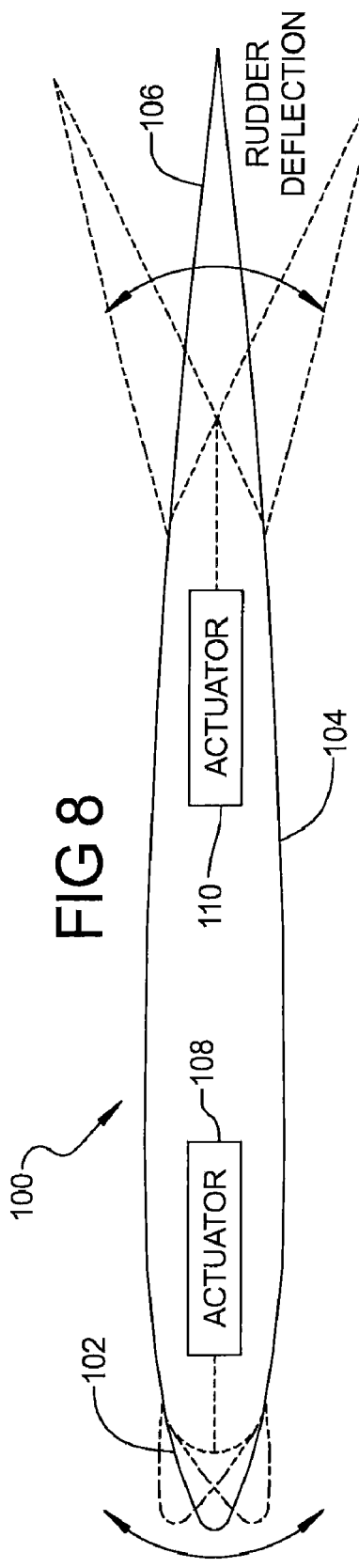
FIG. 8 is a view of another embodiment of the tail of the present disclosure in which the tail includes a leading edge element that is pivotally secured to a main element of the tail, and where the leading edge element can be pivoted in connection with movement of a rudder of the tail, or pivoted independently of movement of the rudder.

Referring now to FIG. 8, a tail 100 in accordance with another embodiment of the present disclosure is shown. The tail 10 in this example forms a vertical tail, but instead of a linearly moveable leading edge element, a pivotal leading edge element 102 is supported from a main element 104. The tail 100 in this example also includes a rudder 106 that is mounted in a conventional sense from the main element 104.

A suitable actuator 108 is used to pivot the leading edge element 102 while a separate, suitable actuator 110 may be used to pivot the rudder 106. Alternatively, a single actuator subsystem could be used to pivot both the leading edge element 102 and the rudder 106. The actuators 108 and 110 both receive signals from a control system of the aircraft 12.

The leading edge element 102 may be pivoted in concert with pivoting movement of the rudder 106 (e.g., both being pivoted toward the port side or starboard side of the aircraft 12), or it may be pivoted independently of movement of the rudder 106. In this embodiment, no significant gap exists between the leading edge element 102 and the main element 106.

When the leading edge element 102 is pivoted in the same direction as the rudder 106 (e.g., both toward the starboard side of the aircraft 12), greater sideslip angles may be attained before flow separates from the main element 104 of the tail 100. Unlike the leading edge element 18, however, the leading edge element 102 may need to move at a high rate (possibly similar to that of the rudder 106), and therefore the actuation requirements are likely to be greater.

Figure 9:
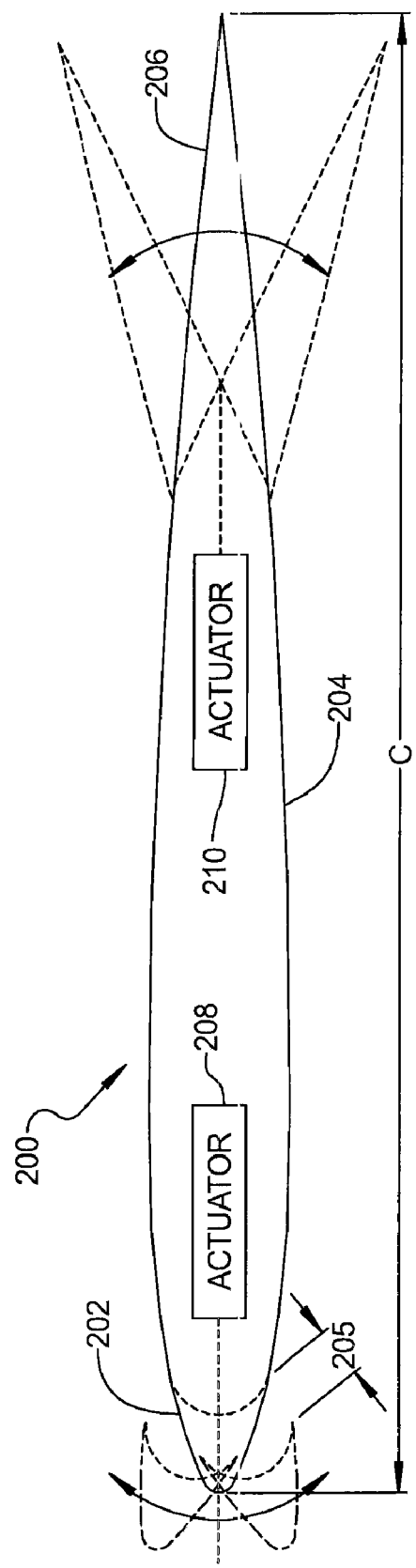
FIG. 9 is a view of another embodiment of the tail of the present disclosure in which the tail includes a leading edge element that is secured to a main element of the tail to enable both pivotal and extending movement of the leading edge element, either with or without concurrent pivoting movement of a rudder.

Referring to FIG. 9, a tail 200 in accordance with another embodiment of the present disclosure is shown. This embodiment is similar to the tail 100 in that a pivotally moveable leading edge element 202 is secured to a main element 204, with a pivotally mounted rudder 206 also being secured to the main element 204. However, an actuator 208 operates to not only pivot the leading edge element 202 but to extend it away from the main element 204 to create a gap 205. The gap 205 may be a few percent of the stowed reference cord "C" shown designated in FIG. 9. The rudder 206 is moved pivotally by an actuator 210. Actuators 208 and 210 may be of the hydraulic, pneumatic or electromechanical varieties, or may comprise any other suitable actuation mechanism.

The leading edge element 202 may be pivoted either in concert with pivoting movement of the rudder 206, or it may be pivoted independently of movement of the rudder. The capability to both pivot and linearly extend the leading edge element 202 from the main element 204 provides even further control over the maximum yawing moment that the leading edge element 202 is able to generate at a given airspeed.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An airborne mobile platform comprising:
    a vertical tail;
    said vertical tail including a leading edge element and a main element, the leading edge element being movable linearly in accordance with a longitudinal centerline of the main element between an extended position and a retracted position to change a distance of a gap between the leading edge element and the main element, and to thus increase a maximum aerodynamic yawing moment provided by the vertical tail.

2. The airborne mobile platform of claim 1, wherein movement of said vertical tail increases said maximum yawing moment for both positive and negative sideslip angles.

3. The airborne mobile platform of claim 1, wherein said leading edge element features a shape that is symmetric about a cruise cord-line of the vertical tail.

4. The airborne mobile platform of claim 1, wherein said leading edge element is pivotally supported from said main element.

5. The airborne mobile platform of claim 1, wherein said leading edge element is further pivotally movable relative to said main element.

6. The airborne mobile platform of claim 1, wherein said vertical tail includes a pivotally moveable rudder that is controlled with movement of said leading edge element.

7. The airborne mobile platform of claim 5, wherein said tail further comprises a pivotally mounted rudder.

8. The airborne mobile platform of claim 7, wherein said rudder is pivoted in connection with movement of said leading edge element.

9. The airborne mobile platform of claim 1, further including an actuator for moving said leading edge element.

10. The airborne mobile platform of claim 9, wherein said actuator comprises a hydraulic actuator.

11. The airborne mobile platform of claim 9, wherein said actuator comprises an electromechanical actuator.

12. The airborne mobile platform of claim 9, wherein said actuator comprises a pneumatic actuator.

* * * * *